United States Patent
Dudar

(10) Patent No.: US 12,370,915 B2
(45) Date of Patent: Jul. 29, 2025

(54) COLLABORATIVE GENERATION SOLAR RADIATION MAPS

(71) Applicant: Ford Global Technologies, LLC, Dearborn, MI (US)

(72) Inventor: Aed M. Dudar, Canton, MI (US)

(*) Notice: Subject to any disclaimer, the term of this patent is extended or adjusted under 35 U.S.C. 154(b) by 905 days.

(21) Appl. No.: 17/540,954

(22) Filed: Dec. 2, 2021

(65) Prior Publication Data

US 2023/0173937 A1    Jun. 8, 2023

(51) Int. Cl.
*B60L 53/60* (2019.01)
*B60L 58/12* (2019.01)

(52) U.S. Cl.
CPC .............. *B60L 53/60* (2019.02); *B60L 58/12* (2019.02); *B60L 2240/622* (2013.01)

(58) Field of Classification Search
CPC .......... B60L 53/60; B60L 53/68; B60L 53/51; B60L 2240/622; B60L 2240/62; B60L 2240/80; B60L 8/003; B60L 58/12; H02S 40/30; H02S 40/38; H02S 20/32; Y02T 90/12; H02J 7/35; G01W 2203/00; G08G 1/146
USPC .................. 701/22, 439; 340/932.2; 320/109
See application file for complete search history.

(56) References Cited

U.S. PATENT DOCUMENTS

| | | | | |
|---|---|---|---|---|
| 2008/0105045 | A1* | 5/2008 | Woro | G01W 1/12 |
| 2011/0191266 | A1 | 8/2011 | Matsuyama | |
| 2011/0295575 | A1* | 12/2011 | Levine | G06F 17/10 |
| 2012/0035897 | A1* | 2/2012 | Bell | G09B 29/12 |
| 2013/0285841 | A1* | 10/2013 | Kirsch | G08G 1/143 |
| 2014/0297072 | A1 | 10/2014 | Freeman | |
| 2016/0238399 | A1* | 8/2016 | Caira | G08G 1/146 |
| 2017/0089721 | A1* | 3/2017 | Akselrod | G01C 21/3407 |

(Continued)

FOREIGN PATENT DOCUMENTS

| | | | |
|---|---|---|---|
| DE | 102016219473 A1 * | 4/2018 | |
| GB | 2522648 A * | 8/2015 | B60L 53/00 |
| JP | 2011242305 A | 12/2011 | |

OTHER PUBLICATIONS

Ken Silverstein, Solar-Powered Electric Vehicle Charging Stations are Just Around the Corner, Forbes, Feb. 10, 2020, 1-9.

(Continued)

*Primary Examiner* — Ramon A. Mercado
*Assistant Examiner* — Ellis B. Ramirez
(74) *Attorney, Agent, or Firm* — Emily Drake; Eversheds Sutherland (US) LLP

(57) ABSTRACT

A method for controlling a first vehicle includes receiving based on a vehicle parking spot locator request, a solar radiance dataset indicative of historic solar radiance at a first parking location of a localized vehicle parking region, and determining, based on the solar radiance dataset, that a predicted solar energy production at the first parking location is greater than any other prediction for available parking location in the parking region during the parking duration. The method includes determining, based on the solar radiance dataset, a first vehicle orientation at the first parking location. The first vehicle orientation provides a maximized probability of solar exposure during the parking duration. The method further includes causing the processor to position the first vehicle in the first parking location and the first vehicle orientation, and charging a first vehicle battery during the parking duration.

12 Claims, 5 Drawing Sheets

(56) References Cited

U.S. PATENT DOCUMENTS

| | | | |
|---|---|---|---|
| 2018/0031736 A1* | 2/2018 | Omitaomu | G01S 17/95 |
| 2018/0314248 A1* | 11/2018 | Dudar | G07C 5/0808 |
| 2020/0269835 A1* | 8/2020 | Hara | H04W 4/48 |
| 2020/0357281 A1* | 11/2020 | Agarwal | G08G 1/141 |
| 2022/0024450 A1* | 1/2022 | Roh | B60W 30/06 |
| 2023/0055909 A1* | 2/2023 | Honda | G08G 1/146 |
| 2023/0079514 A1* | 3/2023 | Nakagawa | G08G 1/147 |

OTHER PUBLICATIONS

Kusheng Liang et al., Charging electric cars from solar energy, Department of Electrical Engineering, Blekinge Institute of Technology, Karlskrona, Sweden, 2016, 1-96.

* cited by examiner

COLLABORATIVE GENERATION SOLAR RADIATION MAPS

BACKGROUND

Many Original Equipment Manufacturers (OEMs) are committing to a highly electrified vehicle lines in the future. Many electric and hybrid electric vehicles (HEVs) include solar arrays onboard the vehicle to recharge vehicle power banks and provide electricity to vehicle devices. Unlike conventional vehicles, where active combustion engine can supply electric power to accessories, the HEVs may have an alternator for power generation using a combustion engine or other generator. Battery power impacts driving range, and can benefit from added power generation capabilities of vehicle-based solar arrays.

Battery electric vehicles (BEVs) generally charge using power from an electric power grid or by reclaiming kinetic energy as the vehicle stops using a regenerative brake system. When charging the electric battery from the grid power, the customer typically incurs a charging cost dependent on time of day and electric demand at the location. Renewable energy may be a cost-effective method of producing energy requirements with less environmental impact than fossil fuel when the vehicle is equipped with solar power hardware, and when environmental conditions are favorable.

Solar power has limitations as the sun has to be shining for solar cells to generate power. In some geographical areas north of the equator, a characteristic of sunshine during certain seasons is often called southern exposure, where the sun shines at low angles and does not reach the middle of the sky at noon. Charging vehicle batteries during times of southern exposure may be challenging due to many areas being shaded and less useful for harvesting solar energy onboard the vehicle.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
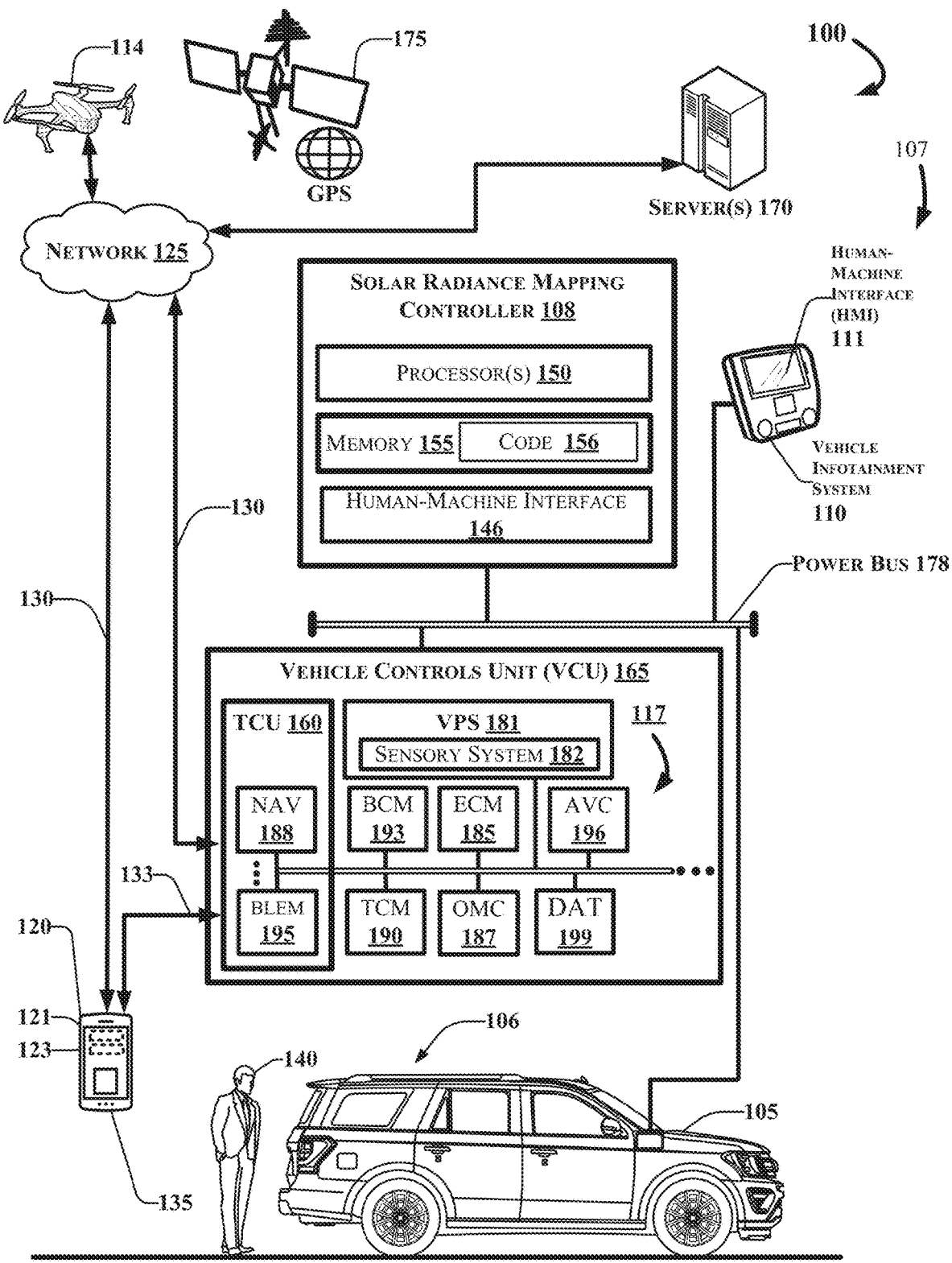
FIG. 1 depicts an example computing environment in which techniques and structures for providing the systems and methods disclosed herein may be implemented.

Today's plug-in electric hybrid vehicles (PHEVs) high voltage batteries are typically charged from two sources: 1) Grid electric power and through a regenerative braking system that captures kinetic energy from the moving vehicle as it brakes. Future HEVs are likely to have alternative power sources that come from renewable energy such as solar power. Some HEVs currently include solar arrays disposed on the vehicle chassis for collecting solar radiant energy.

When charging the electric battery from the grid power, the customer typically incurs a charging cost dependent on time of day and electric demand at the location. Renewable energy is technically free of cost and carbon dioxide, if vehicle is configured with adequate hardware and the environmental conditions are favorable for solar energy capture.

In some geographical regions, depending on the season, the sun shines at low angles and does not reach the middle of the sky at noon. This effect is known as the "southern exposure." With lack of solar light onto the solar roof, recharging the BEV power storage unit is limited or reduced.

It is advantageous, therefore, to provide a system that determines a parking location for a BEV having solar panels disposed on the vehicle chassis that provides a parking location and vehicle orientation that can provide a maximum available solar radiance exposure to the vehicle solar panels.

The systems and methods disclosed herein are configured and/or programmed to implement a connected vehicle system to map roads and parking locations according to solar radiance exposure by crowdsourced data observed by a connected vehicle network. The system measures solar exposure using sensory devices onboard the connected vehicle(s) such as infrared cameras, temperature sensors, and other devices. Connected electric vehicles may chose parking spots based on aggregated solar radiance output associate with mapped locations such that the vehicle choses parking spots and vehicle orientations to maximize solar exposure to the vehicle solar power generation system.

The disclosed collaborative solar power maximization system (hereafter "collaborative solar radiance map system") may generate a solar radiance map usable by electric vehicles (EVs) in a connected vehicle network to maximize solar roof recharging efficiency. In some aspects, the collaborative solar radiance map system may receive data from vehicles of the connected network and generate a crowdsourced maps of solar radiance exposure as measured by respective vehicle's onboard infrared cameras.

As connected vehicles drive around on city streets or parking lots, the outputs of these sensors are fused and averaged to provide an estimate of the solar radiance for respective parking spot(s). Fusing the solar radiance results is favorable as sensors have different boundaries and directions, cameras have direct line of sight and Light Directing and Ranging (LiDAR) is 360-degree coverage, drone can see from above, etc. A solar radiance output is updated in real time to a cloud to generate a map. In addition, the EV may use the map to orient itself properly to maximize the solar exposure (park with front facing a certain direction). Connected vehicles are leveraged to generate the solar radiance map which is populated by the many vehicles that traverse the routes/parking spots. A radiance output scale is used to indicate the magnitude of the output.

According to disclosed embodiments, based on the aggregated solar radiance output at specified parking locations, an EV may choose a parking spot using the collaborative solar radiance map system that maximizes the direct sunlight exposure to the solar roof. The system may allow EVs to maximize sensors already present in vehicles by inferring a magnitude of solar radiance in various ways, such as measuring the surface temperatures of parking spots and opportunistically measuring solar output when a vehicle parks in a random parking location. The vehicle sensors can include, among other devices, onboard cameras, solar roof panels, and/or LiDAR. The collaborative solar radiance map system may update the solar radiance map to include measured temperatures, solar radiance, and surface moisture conditions. The system may further include real-time correlation of atmospheric conditions (sunshine, clouds, precipitation, etc.) with historic data and form vehicle parking recommendations that maximize sunlight hours and exposure given particular locations.

According to one or more disclosed embodiments, the collaborative solar radiance map system solar radiance map may also be generated by a flying an unmanned aerial vehicle (drone) with onboard temperature or camera sensory capability. The collaborative solar radiance map system may cause the vehicle and/or drone to collect sensory data, and may aggregate drone data with vehicle-generated data.

In one example embodiment, a connected vehicle and/or drone may collect solar radiance information that is localized using a global positioning system (GPS), and update the solar radiance map for real-time solar radiance information. The collaborative solar radiance map system may weight the updates more heavily than respectively older data as infrastructure, weather patterns, and microclimate changes occur over time.

In one example embodiment, a vehicle may query the solar radiance map on the cloud responsive to a park command, and forward localized vehicle information to the system. The localized vehicle information may include GPS location of a parking lot or other operating environment feature, time information, date information, and other characteristics of the parking request. The system may generate a map and aggregate historical aggregated data for solar radiance for the requested location, where the aggregated data is crowdsourced from multiple connected vehicles in the network, which may provide an averaged data source having greater reliability than a single data source.

In one example embodiment, the system may transmit an instruction set having optimized parking instructions that, when executed by the vehicle, parks the vehicle at a parking spot that offers the best solar radiance at the prevailing time. The EV may also use lookahead knowledge and choose the parking spot that corresponds to the most stable solar radiance for the projected parking duration.

In other aspects, the instruction set may include a parking posture for the vehicle at the particular location, where the posture places the vehicle solar panels at a favorable angle to the direction of incoming solar energy during the time parked there. Responsive to determining the dataset with optimized solar radiance positioning information for the vehicle, the vehicle may navigate and position to the parking spot such that a vehicle portion may be positioned in a way offering higher radiance during the parking duration. For example, when the sun is predicted to be stronger at a front or back portion of the vehicle (where the other vehicle portion is substantially shaded during the parking duration, also called half radiance), then instructions may include executable information to position the vehicle inside the parking spot such that the solar roof is exposed to the portion having the higher radiance.

In one example embodiment, the vehicle may record its solar radiance output from the solar roof during the parking duration, and transmit the electrical output of the solar array to the system. The energy output coupled with date information, time information, and information indicative of whether the vehicle parked in compliance with the instruction set may provide reliability data indicative of whether the parking spot is indeed a good location for receiving solar energy at the specific time/date. This enhances the map accuracy as the data from the vehicle's solar roof is highly accurate and not inferred from surface temperatures. Moreover, when vehicle's own solar output matches the cloud map projected output, the parking spot is high confidence location for solar charging, which may cause the system to increase a relative reliability weight for the solar radiance prediction feature associated with the subject location. Furthermore, as the solar radiance changes by time of day or at a predetermined interval, the system may cause the vehicle to query the map cloud and reassesses the solar radiance output. Responsive to determining that a new parking spot in the parking lot has higher solar radiance, the system may cause the vehicle to self-reposition.

The disclosed system may provide connected vehicles with an enhanced ability to select parking spots having optimal most solar radiance. The system may further provide a fleet of connected EVs to minimize refueling costs by obtaining and sharing crowdsourced solar radiance information to maximize fleet charging capabilities while the vehicles are parked and otherwise unused.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

FIG. 1 depicts an example computing environment 100 that can include a vehicle 105 configured and/or programmed to include a collaborative generation solar radiance mapping system 107. The vehicle 105 may include an automotive computer 145, and a Vehicle Controls Unit (VCU) 165 that can include a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

The vehicle 105 may also receive and/or be in communication with a Global Positioning System (GPS) 175. The GPS 175 may be a satellite system (as depicted in FIG. 1) such as the Global Navigation Satellite System (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a BEV drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include an automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that use no human input for operation, and may not include human operational driving controls.

According to embodiments of the present disclosure, the collaborative generation solar radiance mapping system 107 may be configured and/or programmed to operate with a vehicle having a Level-0 (no autonomous vehicle features) through Level-5 autonomous vehicle controller. Accordingly, the collaborative generation solar radiance mapping system 107 may provide some aspects of human control to the vehicle 105, when the vehicle is configured as an AV.

The mobile device 120 can include a memory 123 for storing program instructions associated with an application 135 that, when executed by a mobile device processor 121, performs aspects of the disclosed embodiments. The application (or "app") 135 may be part of the collaborative generation solar radiance mapping system 107, or may provide information to the collaborative generation solar radiance mapping system 107 and/or receive information from the collaborative generation solar radiance mapping system 107.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) that can be direct connection(s) between the vehicle 105 and the mobile device 120. The wireless connection(s) 133 may include various low-energy protocols including, for example, Bluetooth®, Bluetooth® Low-Energy (BLE®), UWB, Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Data Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the collaborative generation solar radiance mapping system 107, in accordance with the disclosure. The automotive computer

145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a collaborative generation solar radiance mapping program code 156. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The solar radiance mapping controller 108 may further include a Human Machine Interface (HMI) 146 providing an interface for receiving messages associated with parking locations, selecting and/or controlling vehicle parking features, etc. The HMI 146 may be similar to or be included as part of the HMI 111.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, an Occupant Monitoring Controller (OMC) 187, a Driver Assistances Technologies (DAT) controller 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer-readable memory 155 of the automotive computer 145, including instructions operational as part of the collaborative generation solar radiance mapping system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a Controller Area Network (CAN) bus.

In some aspects, the TCU 160 may further provide connectability between the vehicle 105 and the mobile device 120 such that the solar radiance mapping controller 108 can notify the user 140 when the collaborative generation solar radiance mapping system 107 alters a vehicle parking location autonomously. For example, as explained hereafter, the solar radiance mapping controller 108 may determine that a second parking location will provide optimal solar radiance exposure to the vehicle solar array panels 106 during a subset (some portion of) the parking duration. The solar radiance mapping controller 108 may make such a determination autonomously during the parking duration, cause an Autonomous Vehicle Controller (AVC) 196 to reposition the vehicle 105, and notify the user 140 via small messaging service (SMS) or the application 135 operable on the mobile device 120. Accordingly, the user 140 may have awareness of the new parking location of their vehicle that provides a robust charging session during the available charging time that the vehicle 105 is parked.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a CAN bus organized with a multi-master serial bus standard for connecting two or more of the ECUs 117 as nodes using a message-based protocol that can be configured and/or programmed to allow the ECUs 117 to communicate together. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the collaborative generation solar radiance mapping system 107, and/or the server(s) 170, etc.), and may also communicate with one another with or without a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the collaborative generation solar radiance mapping system 107, and/or via wireless signal inputs received via the wireless connection(s) 133 from other connected devices such as the mobile device 120, among others. The ECUs 117, when configured as nodes in the bus 180, may include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection(s) 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The OMC 187 can include sensory and processor functionality and hardware to facilitate user and device authentication, and provide occupant customizations and support that provide customized experiences for vehicle occupants. The OMC 187 may connect with a Driver Assist Technologies (DAT) controller 199 configured and/or programmed to provide biometric authentication controls, including, for example, facial recognition, fingerprint recognition, voice recognition, and/or other information associated with characterization, identification, and/or verification for other human factors such as gait recognition, body heat signatures, eye tracking, etc.

The DAT controller 199 may provide Level-1 through Level-4 automated driving and driver assistance functionality that can include, for example, active parking assistance, trailer backup assistance, adaptive cruise control, lane keeping, and/or driver status monitoring, among other features. The DAT controller 199 may also provide aspects of user and environmental inputs usable for user authentication. Authentication features may include, for example, biometric authentication and recognition.

The DAT controller 199 can obtain input information via the sensory system(s) 182, which may include sensors disposed on the vehicle interior and/or exterior (sensors not shown in FIG. 1). The DAT controller 199 may receive the sensor information associated with driver functions, vehicle functions, and environmental inputs, and other information. The DAT controller 199 may characterize the sensor information for identification of biometric markers stored in a secure biometric data vault (not shown in FIG. 1) onboard the vehicle 105 and/or via the server(s) 170.

In other aspects, the DAT controller 199 may also be configured and/or programmed to control Level-1 and/or Level-2 driver assistance when the vehicle 105 includes Level-1 or Level-2 autonomous vehicle driving features. The DAT controller 199 may connect with and/or include a Vehicle Perception System (VPS) 181, which may include internal and external sensory systems (collectively referred to as sensory systems). The sensory systems 182 may be configured and/or programmed to obtain sensor data usable for biometric authentication, and for performing driver assistances operations such as, for example, active parking, trailer backup assistances, adaptive cruise control and lane keeping, driver status monitoring, and/or other features.

The sensory system 182 may further include and/or communicate with an unmanned aerial vehicle (UAV) 114 disposed onboard the vehicle 105. The UAV 114 may include one or more sensory devices included in the VPS 181, and may provide data associated with an operating environment of the vehicle 105. For example, the UAV 114 may provide surface solar radiance information at or near parking locations, and share the sensory data with the vehicle 105 and/or the server(s) 170. The UAV may be autonomous or semi-autonomous, and include any aerial vehicle chassis configuration.

When the vehicle 105 is configured as a Level-5 autonomous vehicle, the vehicle 105 may include an AVC 196 in lieu of or in addition to the DAT controller 199 for autonomous navigation. The VPS 181 may provide situational awareness to the AVC 196 for autonomous navigation. For example, the VPS 181 may include one or more proximity sensors may include one or more Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The proximity sensor(s) of the VPS 181 may provide sensory data used to alert the AVC 196 to the presence of sensed obstacles, and provide trajectory information, where the trajectory information is indicative of moving objects or people that may interact with the vehicle 105. The trajectory information may include one or more of a relative distance, a trajectory, a speed, a size approximation, a weight approximation, and/or other information that may indicate physical characteristics of a physical object or person.

The AVC 196 may be configured and/or programmed to aggregate information from the NAV 188, such as current position and speed, along with sensed obstacles from the proximity sensor(s) of the VPS 181, and interpret the aggregated information to compute an efficient path towards a destination such that the vehicle 105 avoids collisions. Sensed obstacles can include other vehicles, pedestrians, animals, structures, curbs, and other random objects. In some implementations the proximity sensor(s) may be configured and/or programmed to determine the lateral dimensions of the path upon which the vehicle 105 is traveling, e.g., determining relative distance from the side of a sidewalk or curb, to help aid vehicle navigation and control to maintain precise navigation on a particular path.

In one aspect, solar radiance mapping controller 108 may measure surface solar radiance localized to a parking spot in a parking region, and determine, based on the solar radiance dataset, a first estimate of partial duration solar radiance output during a future subset of parking duration. For example, the parking duration may be a single afternoon from approximately 2 pm to 5 pm. The solar radiance mapping controller 108 may determine that a second parking location within the parking region (e.g., a parking lot) will produce a greater volume of solar radiant energy collectable by the vehicle solar array panels 106. More particularly, after determining that the second parking spot is available for the vehicle 105 to change parking locations, the solar radiance mapping controller 108 may determine, based on the solar radiance dataset, that a second parking location within the parking region is associated with a second estimate of partial duration solar radiance output, wherein the second estimate of partial duration solar radiance output is greater than the first estimate. Accordingly, the solar radiance mapping controller 108 may cause the AVC 196 to change location from the first parking location to the second parking location by engaging the autonomous drive and repositioning the vehicle 105 in the second parking spot.

In some aspects, this operation may further include determining the best vehicle orientation for the second parking spot as well. For example, the solar radiance mapping controller 108 may determine, based on the solar radiance dataset, a second vehicle orientation at the second parking location, where the second vehicle orientation includes a greater probability of solar exposure during the subset of parking duration than the first vehicle orientation.

For example, where the second parking position of two possible parking orientations. Vehicle orientations may refer to the way in which the vehicle is positioned in the parking location, such as the vehicle front facing the parking curb, or the vehicle front facing away from the parking curb (e.g., backed in to the parking location). If one orientation would provide direct sun exposure to one half of the parking location, and positioning the vehicle 105 with the front facing in or the vehicle front facing out will provide the maximum probability of full sun exposure to the vehicle solar array panels 106 during a subset of the parking duration, then the solar radiance mapping controller 108 may determine the optimal vehicle orientation. For example, if the parking duration is 2 pm to 5 pm, an example subset of the parking duration may be from 4 pm to 5 pm. Accordingly, the AVC 196 may cause the AVC 196 to position the vehicle 105 in the second parking location according to the solar radiance dataset and the second vehicle orientation such that the vehicle solar array panels 106 maintains the highest solar exposure during the parking duration.

The computing system architecture of the automotive computer 145, VCU 165, and/or the collaborative generation solar radiance mapping system 107 may omit certain computing modules. It is understood that the computing environment depicted in FIG. 1 is an example of a possible implementation according to the present disclosure, and thus, is not to be considered limiting or exclusive.

The automotive computer 145 may connect with the vehicle infotainment system 110 that may provide an interface for the navigation and GPS receiver (e.g., the NAV 188), and the collaborative generation solar radiance mapping system 107. The vehicle infotainment system 110 may include a human-machine interface (HMI) 111, and may include voice recognition features, biometric identification capabilities that can identify users based on facial recognition, voice recognition, fingerprint identification, or other biological identification means. In other aspects, the vehicle infotainment system 110 may provide user identification using mobile device pairing techniques (e.g., connecting with the mobile device 120, a Personal Identification Number (PIN)) code, a password, passphrase, or other identifying means.

Figure 2:
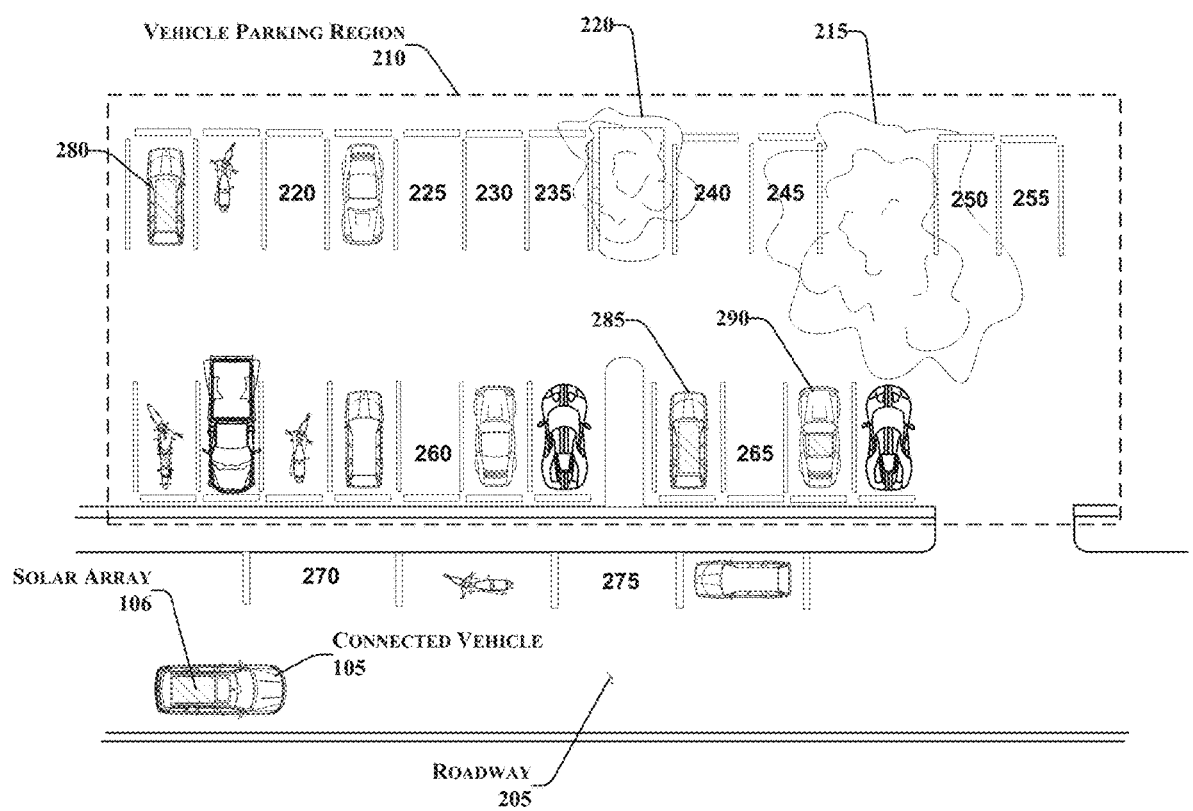
FIG. 2 illustrates an example collaborative map generation scenario in accordance with embodiments of the present disclosure.

FIG. 2 illustrates an example of collaborative map generation in accordance with embodiments of the present disclosure. The vehicle 105 is illustrated as driving along a roadway 205. The vehicle 105 is equipped with the vehicle solar array panels 106, which may benefit from direct sunlight to charge the vehicle batteries (not shown in FIG. 2) during an upcoming parking duration. Parking an autonomous vehicle or semi-autonomous vehicle having a solar array disposed on the vehicle chassis at a location having poor sunlight exposure is futile for recharging the BEV power storage system.

It may be difficult for a user to know ahead of time which parking location (parking spot) will deliver continuous and unobstructed sunlight, since the sun exposure is dynamically changing throughout the day, and will be different throughout the year due to a predictable but changing position of the sun. Sunlight hours can fluctuate greatly between summer/winter seasons especially for areas far north and south of the equator. For connected vehicles having a solar array that charges vehicle power storage systems, an opportunity exists to generate power from the environment, which mitigates the reliance of deriving vehicle power from a power grid. Even when the sun is out, there are places which have natural shade, and the sun may not shine through as well.

As shown in FIG. 2, an example vehicle parking region 210 is shown, having in the parking environment two trees 215 and 220 that will cast shadows in the vehicle parking region 210. In many city environments, surrounding buildings and other infrastructure (not shown in FIG. 2) also block sunlight, which depend on the relative position of the buildings and structures relative to parking locations.

For example, the vehicle parking region 210 is shown with available parking locations 220, 225, 230, 235, 240, 245, 250, 255, 260, and 265. Also shown are two street parking locations 270 and 275. As the vehicle 105 proceeds toward the vehicle parking region 210 with the intent to park the vehicle 105, which of these locations will provide direct sunlight exposure to the vehicle solar array panels 106 for the maximum time during the intended parking duration? The answer may depend on the relative position of the sun (not shown in FIG. 2), which may cast shadow on nearly any of the available parking locations 220-265, depending on the time of year, cloud coverage, and the time of day. Moreover, the surrounding buildings (buildings not shown in FIG. 2) may allow for direct sun exposure, partial sun exposure, or provide full shade to any of the parking locations 270 and 275 along the roadway 205, and/or the available parking locations 220-265.

When the sun shines on a surface, the surface heats it up and tends to store cumulative heat throughout the day. If the surface is asphalt, the surface may heat up even more (e.g., store more thermal energy) than concrete. Earth surfaces may store less energy than concrete, asphalt or stone surfaces. The stored thermal energy may be measurable in terms of surface solar radiance output. As a respective surface receives longer durations of solar exposure, that surface may heat up, store thermal energy, and continue to emit that surface solar radiance output throughout the day, even after the heating cycle has ended (e.g., the sun goes down or the surface falls under shade).

As connected vehicles drive on city streets or parking lots (e.g., the vehicle parking region 210), the collaborative generation solar radiance mapping system 107 may aggregate the collective sensory output to generate a solar radiance dataset usable to estimate solar radiance for respective parking locations. The system may benefit from the robust data collection resources by fusing the solar radiance results from various sensory devices having different operative boundaries, reach, and capabilities. For example, sensory cameras have direct line of sight and LiDAR generally realizes full 360-degree coverage. An unmanned aerial vehicle (e.g., the UAV 114) may observe parking locations from above. The collaborative generation solar radiance mapping system 107 may generate the solar radiance dataset and update the dataset in real time. The collaborative generation solar radiance mapping system 107 may also generate a solar radiance map that correlates the solar radiance dataset to localized areas in the vehicle parking region 210 (among other areas).

The collaborative generation solar radiance mapping system 107 may use data received from one or more connected vehicles to generate the solar radiance map, and update the solar radiance map using the connected vehicles that traverse the routes/parking spots. The collaborative generation solar radiance mapping system 107 may utilize a radiance output scale to indicate a magnitude of the output.

When a connected vehicle is parked in the vehicle parking region 210, the parked vehicle may measure, record, and report environmental conditions that indicate surface solar radiance output. For example, a vehicle 280 is illustrated in FIG. 2 parked in the vehicle parking region 210. During the parking duration, the vehicle 280 may record surface radiance output at that parking location during the time and day(s) that the vehicle 280 is parked. Similarly, another connected vehicle 285 is parked in the vehicle parking region 210, and may provide that same data respective to the second parking location. The onboard sensory devices (not shown in FIG. 2) onboard the vehicle 285 may also measure surface solar radiance at the parking location 265. In some aspects, the vehicle 285 may also provide surface solar radiance output data for other parking locations within the field of sensory device view of the vehicle 285, such as the parking locations 225-255. The connected vehicles 285, 105, etc., may provide the solar radiance, GPS, time, date, environmental observations, and other data to the server(s) 170 (as shown in FIG. 1) for scaling and generation of the solar radiance map and solar radiance dataset.

In one aspect, the collaborative generation solar radiance mapping system 107 may utilize onboard sensors already present in vehicles 280, 285, 290 and/or 105 to infer the magnitude of solar radiance by measuring the surface temperatures of parking spots and opportunistically measuring solar output when a vehicle parks in a random parking location. These sensors can include, for example, any of the sensory devices disclosed with respect to the VPS 181 including onboard cameras, solar roof panels and sensory devices, and/or LiDAR. The collaborative generation solar radiance mapping system 107 may communicate information to and from the connected vehicles 280, 285, 290, and 105 to measure temperature gradient of a parking lot locations in the vehicle parking region 210, and update a solar radiance map (not shown in FIG. 2) with information including time of day, week, month, temperature and sensory data, and other characteristics indicative of surface solar radiance. The connected vehicles 280-290 and 105 may upload the data to a cloud server (e.g., the server(s) 170 as shown in FIG. 1). The distributed computing system (e.g., server(s) 170) may update the solar radiance map, and share the updated map with connected vehicle(s) looking for a parking location that provides a maximum solar radiance exposure during a parking duration. In other aspects, a connected autonomous or semi-autonomous drone vehicle (e.g., the UAV 114 as shown in FIG. 1) may also provide solar radiance information to update a solar radiance map sharable with the connected vehicles. The solar radiance map may include a solar radiance dataset that correlates the historic solar radiance data with localized parking locations observed by the connected vehicles.

The collaborative generation solar radiance mapping system 107 may use available sources of information to generate the solar radiance dataset having date and time information, GPS location of parking spot information, and surface solar radiance information that can compensate for winter solstice effects and other natural shading obstructing surface from getting sunlight. Accordingly, an updated solar radiance map may include and/or be part of the solar radiance dataset, such that respective parking locations may respectively have data associated with them that are usable by the system to predict solar radiance at a future date and/or parking duration (e.g., span of time).

In one example, the collaborative generation solar radiance mapping system 107 may determine solar radiance output such that, $$\text{Surface Solar Radiance Output} = k_1 * \text{LiDAR} + k_2 * \text{Infrared Camera Output} + k_3 * \text{Solar Roof Sensor Output} + k_4 * \text{Drone Sensor Output},$$

where $k_1$, $k_2$, $k_3$, and $k_4$ are scaling factors.

Solar roof sensor output from vehicle parked at specified location is a direct measurement of the solar radiance, the scaling factor $k_3$ may be given more weight than other indirect sensors $k_1$, $k_2$, and $k_4$ that measure parking spot surface temperatures. Solar Roof Sensor Output may be sensory data obtained directly from the solar roof array (e.g., 106) such as energy output (Watts), temperature (degrees C.), or other sensory information. The Drone Sensor Output may include similar information collected by the UAV 114 (as shown in FIG. 1). An example scaling can include $k_1 = k_2 = k_4 = 0.2$ and $k_3 = 0.4$.

Figure 3:
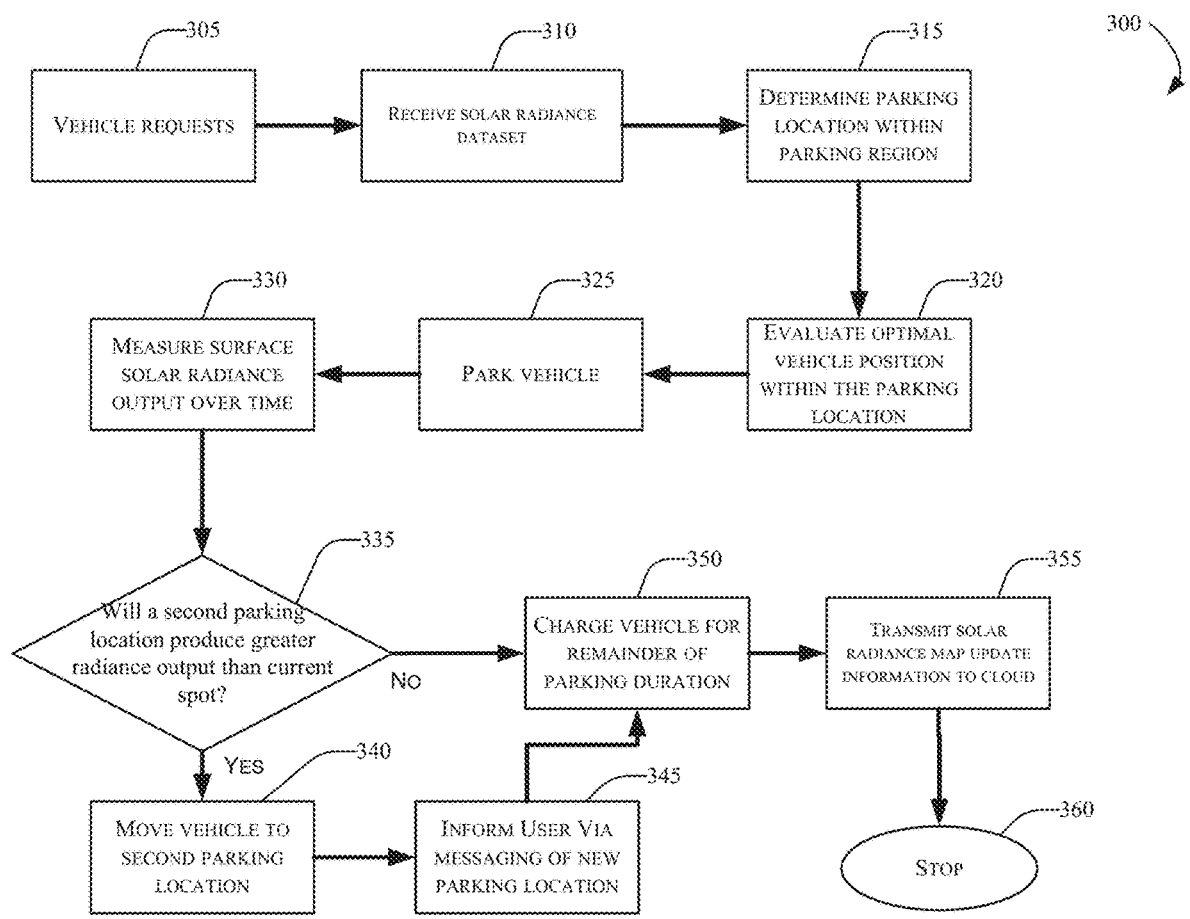
FIG. 3 depicts a programmatic logic flow diagram in accordance with the present disclosure.

FIG. 3 depicts a programmatic logic flow diagram 300 in accordance with the present disclosure. At step 305 the vehicle 105 may request a parking spot by transmitting a request packet (not shown in FIG. 3) to the server(s) 170. Accordingly, the vehicle 105 may query the solar radiance map on the cloud, and notify the server(s) 170 with an indication of current or intended GPS location of a parking lot (e.g., vehicle parking region 210), time of day and/or time frame for the parking duration. The server(s) 170 may receive the request, determine one or more parking locations having the highest probability of extended solar radiance during the parking duration, and return a solar radiance dataset to the requesting vehicle 105.

At step 310, the vehicle 105 may receive the solar radiance dataset, which may include a solar radiance map having historical aggregated data for solar radiance for one or more proposed parking locations in the requested vehicle parking region 210. Using the solar radiance dataset, at step 315 the vehicle 105 may determine a parking location within the parking region that offers a predicted maximum solar radiance exposure during the parking duration.

At step 320, the vehicle 105 may evaluate an optimal vehicle position within the parking location identified at step 315. This may include determining where, on the vehicle, the vehicle solar array panels 106 is positioned (e.g., rooftop, side vehicle panels, etc.), any structural characteristics that may inform a particular vehicle orientation given the time of day, direction of the sun during the parking duration, cardinal direction of the parking location, and geographic or structural limitations that may limit full sun exposure during any part of the proposed parking duration.

This information may be included as part of the solar radiance dataset, as well as observed characteristics at the parking location itself. For example, the solar radiance dataset may include sensory data indicative of sub-regions of a given parking location that are known to receive less sunshine at a particular calendar date, a particular time of day, etc. Because celestial events are precise and repeatable, observation made by multiple vehicles and/or sensory devices, over time, may provide a robust indication of the relative reliability of a prediction of solar exposure at a future time. Examples can include an indication that a street-facing portion of one half of a parking location tends to be in partial shade during the hours of 4-6 pm in the month of November. On the other hand, in the months of June through October, the parking location receives full sun during this time. The collaborative generation solar radiance mapping system 107 may obtain multiple sensory data over time from various vehicles and sensory devices, where duplicative data indicates that a front half portion of the parking location will be shaded during a future parking duration (or during a subset of time for that parking duration).

Accordingly, at step 320, the system may evaluate the optimal vehicle position within the parking location, and park the vehicle at step 325 at the parking location.

At step 330 the vehicle 105 may measure surface solar radiance output over time. The vehicle 105 may perform this step while it is parked. It should also be appreciated that the vehicle 105 (and any other connected vehicle) may perform this operation routinely as it drives and operates normally throughout the day or night, which provides crowdsourced sensory data usable by the system to update and generate the solar radiance dataset and the solar radiance map.

At step 335, the system determines whether a second parking location may produce grater radiance output than a current parking location. For example, within the same vehicle parking region 210, the vehicle 105 may determine that three separate parking locations have become available since the beginning of the parking duration. If the parking duration is intended to be three hours, and the vehicle 105 determines after the first hour that there are now three second parking locations available for use for the remaining subset of the parking duration, the vehicle may determine whether a predicted solar radiance during that remaining parking duration subset will produce more solar energy for battery charging than the present parking location. In one example, the collaborative generation solar radiance mapping system 107 may determine whether the predicted energy collection exceeds a threshold value (e.g., 20% more, 30% more, etc.).

Responsive to determining that a prospective second parking location will produce greater radiance output than the current spot, at step 340 the collaborative generation solar radiance mapping system 107 may cause the vehicle to move to a second parking location.

At step 345 the collaborative generation solar radiance mapping system 107 may inform the vehicle 105 user 140 via messaging system that the vehicle 105 has been moved from the first parking location to the second parking location. At step 350, responsive to determining that the vehicle 105 will not produce a greater amount of output by moving to the second spot, the collaborative generation solar radiance mapping system 107 may proceed to charge the vehicle power storage system for the remainder of the parking duration (e.g., during the parking duration subset).

Responsive to moving the vehicle to the second parking location, at step 350 the collaborative generation solar radiance mapping system 107 may charge the vehicle power storage system from the new parking location.

At step 355, the vehicle 105 may transmit the solar radiance map update information collected and/or observed during the parking duration by transmitting the data to the server(s) 170. The data may include date information, time information, solar radiance information at the first parking location, solar radiance information at the second parking location, solar radiance information at respective sections of one or more of the first parking location and/or the second parking location, solar radiance information at other parking locations within the field of view of vehicle 105 and/or UAV 114 sensory device(s), and/or other environmental information such as weather, light measurements indicative of full sun, partial sun, shade, etc., updates indicative of new structures or buildings proximate to the parking location(s), etc.

The programmatic logic stops at step 360.

Figure 4:
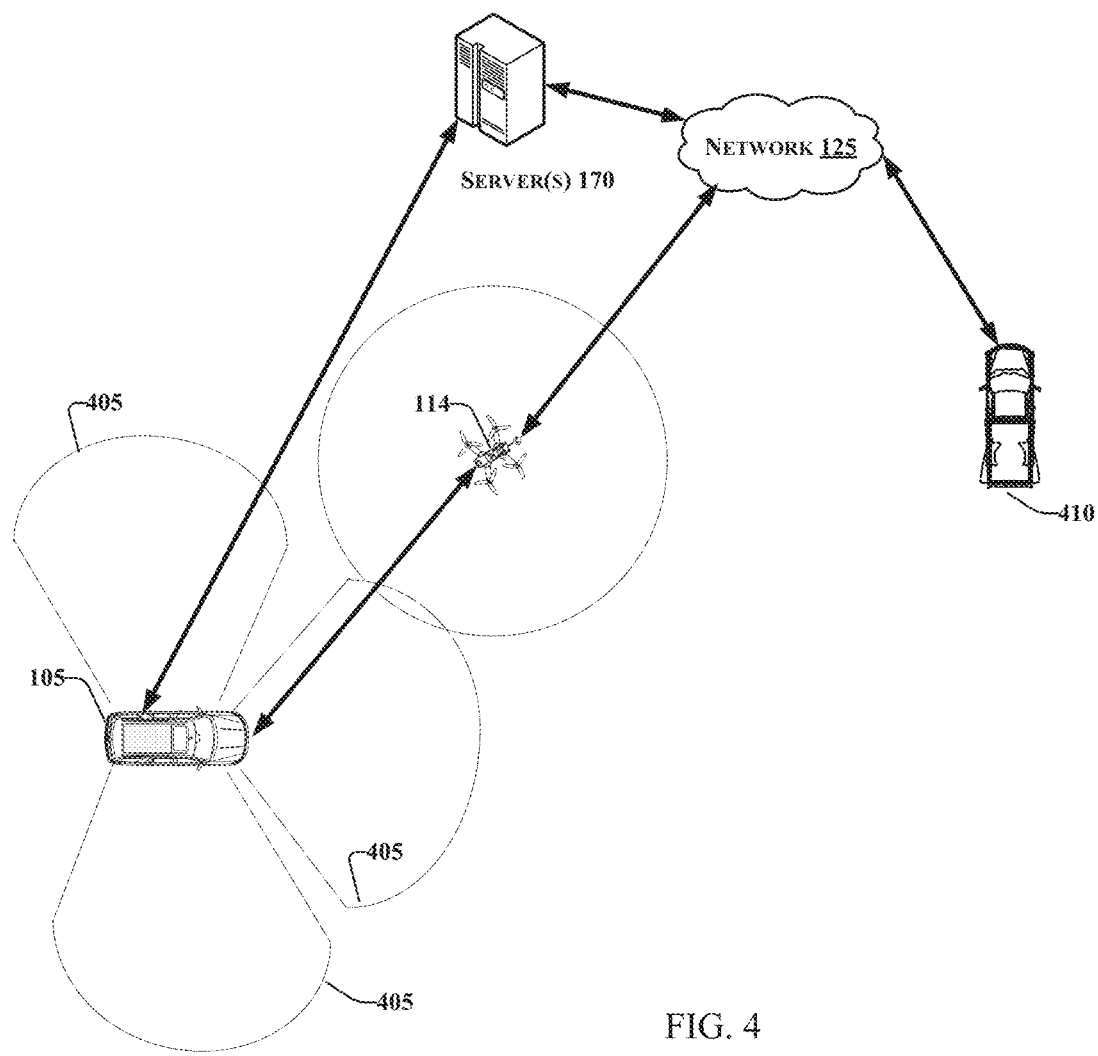
FIG. 4 illustrates a collaborative map generation in accordance with embodiments of the present disclosure.

FIG. 4 illustrates a collaborative map generation using the UAV 114 and the vehicle 105 sensory systems, in accordance with embodiments of the present disclosure.

The vehicle 105 is depicted with sensory field indicators 405 that provide sensory information proximate to the vehicle 105. In some aspects described above, the vehicle 105 and/or the collaborative generation solar radiance mapping system 107 may benefit from having sensory information in areas that may be outside of the field of view (e.g., beyond the sensory field indicators 405) of the vehicle 105. Accordingly, the UAV 114 may accompany the vehicle 105 and deploy autonomously and/or by command of the solar radiance mapping controller 108 to obtain sensory data indicative of surface solar radiance for localized regions proximate to but outside of the field of view of the vehicle 105. For example, the UAV 114 may deploy and evaluate whether one or more second parking locations have become available during a subset of a parking duration, determine a current solar radiance indication for the one or more now available parking locations, and report the sensory data to the vehicle 105 and/or the server(s) 170.

Another connected vehicle 410 may request a parking spot from the server(s) 170, and the data observed by the UAV 114 and/or the vehicle 105 may be aggregated, updated to the solar radiance dataset and the solar radiance map, and shared with the connected vehicle 410.

Figure 5:
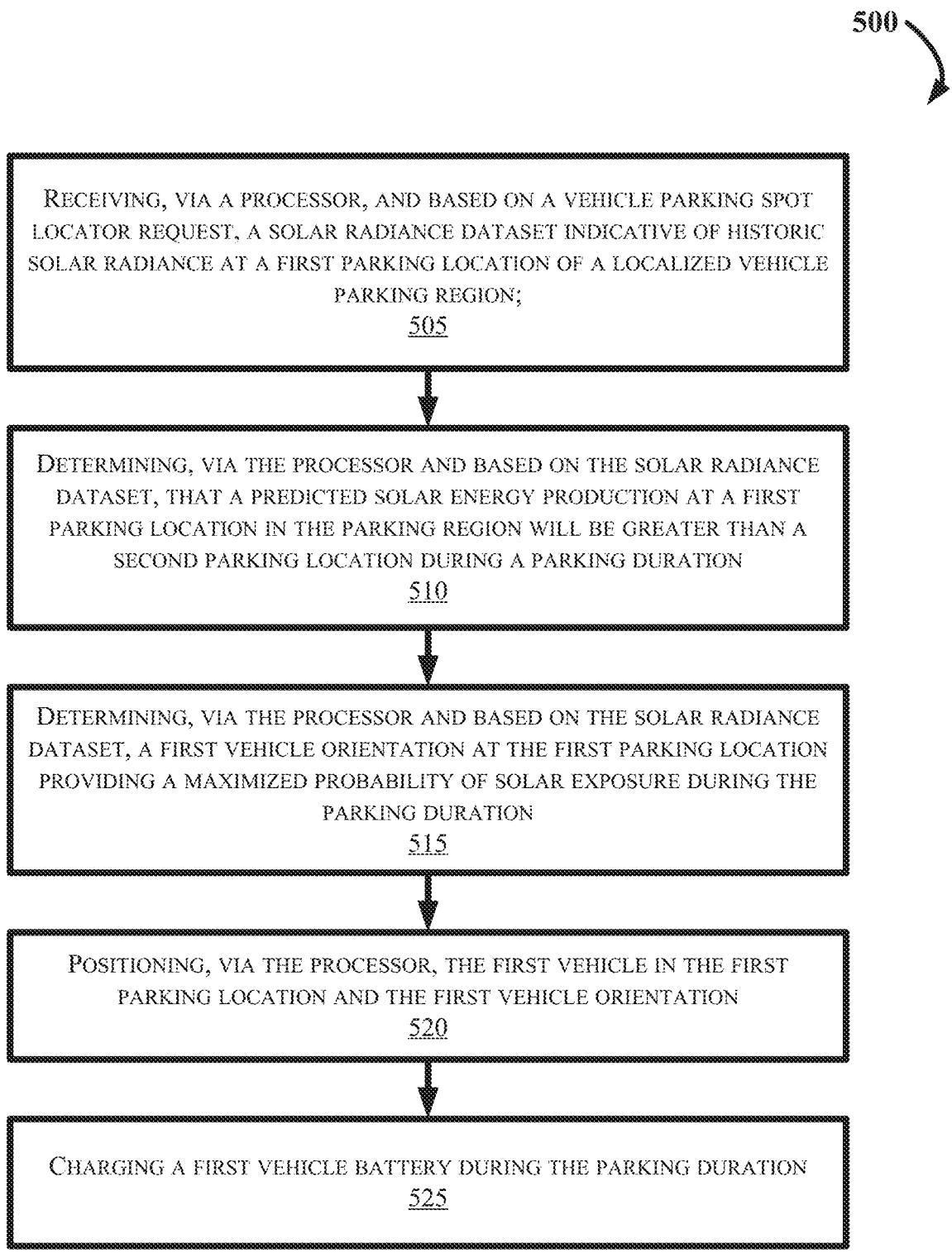
FIG. 5 depicts a flow diagram of an example method for controlling a vehicle in accordance with the present disclosure.

FIG. 5 is a flow diagram of an example method 500 for controlling a vehicle, according to the present disclosure. FIG. 5 may be described with continued reference to prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

According to embodiments described above, the disclosed system provides for a connected vehicle method that collaboratively maps roadways and parking locations according to respective solar radiance exposure as measured onboard sensory devices. Based on the aggregated solar radiance output at specified parking locations, the BEVs may choose a parking spot and vehicle orientation within that parking spot that maximizes the direct sunlight exposure to the vehicle chassis solar array.

Referring now to FIG. 5, at step 505, the method 500 may commence with receiving, via a processor, and based on a vehicle parking spot locator request, a solar radiance dataset indicative of historic solar radiance at a first parking location of a localized vehicle parking region. The solar radiance map may include measured solar radiance data provided via a second vehicle sensory system, such as another connected vehicle or a robotic autonomous vehicle associated with the first vehicle. For example, second vehicle sensory system may be disposed on an autonomous aerial drone vehicle chassis.

In some aspects, the solar radiance dataset is based on a solar radiance map indicative of measured solar energy availability in a geofenced region comprising the first parking location. The solar radiance dataset can include historic measured solar radiance availability localized at the first parking location. In other aspects, the solar radiance dataset further includes date and time data, and weather condition information at the first parking location, the weather condition information associated with the date and time data.

At step 510, the method 500 may further include determining, via the processor and based on the solar radiance dataset, that a predicted solar energy production at a first parking location in the parking region will be greater than a second parking location during a parking duration.

At step 515, the method 500 may further include determining, via the processor and based on the solar radiance dataset, a first vehicle orientation at the first parking location providing a maximized probability of solar exposure during the parking duration. This step may include determining, via the processor and based on the solar radiance dataset, a second vehicle orientation at the second parking location, where the second vehicle orientation includes a greater probability of solar exposure during the subset of parking duration than the first vehicle orientation. Accordingly, this step may include positioning, via the processor, the first vehicle in the second parking location according to the solar radiance dataset and the second vehicle orientation.

At step 520, the method 500 may further include positioning, via the processor, the first vehicle in the first parking location and the first vehicle orientation. This step may include This step may include determining, via the processor and based on the solar radiance dataset, a first estimate of partial duration solar radiance output during a future subset of parking duration, determining, via the processor and based on the solar radiance dataset, that a second parking location within the parking region is associated with a second estimate of partial duration solar radiance output, wherein the second estimate of partial duration solar radiance output is greater than the first estimate; and causing, via the processor, the first vehicle to change location from the first parking location to the second parking location.

At step 525, the method 500 may further include charging a first vehicle battery during the parking duration. This step may include measuring, during the parking duration, a surface solar radiance output at or proximate to the first parking location; and updating a solar radiance map based on the surface solar radiance output. In some aspects, this step may include updating the solar radiance map by transmitting, via the processor, the surface solar radiance output to a solar radiance map server.

Measuring the surface solar radiance output further includes determining, via a LiDAR sensory device, a k1 energy output; determining, via an infrared sensory device, a k2 energy output; determining, via a solar panel voltmeter sensory device, a k3 energy output; determining, via a drone-based sensory device, a k4 energy output; and computing the surface solar radiance output based on one or more of the k1, k2, k3, and k4 energy outputs. The k1, k2, k3, and k4 energy outputs comprise a first scaling factor, a second scaling factor, a third scaling factor, and a fourth scaling factor. The third scaling factor, in one embodiment, is greater than the first scaling factor, the second scaling factor, and the fourth scaling factor.

Embodiments of the present disclosure describe a system that may generate a data-rich and collaborative map using crowdsourced data that may benefit vehicle owners by maximizing the available fee solar energy during their everyday vehicle use. The system may generate a mature map that remains updated by hundreds or thousands of connected vehicles such that a BEV may have practical and easy to use information for predicting and choosing optimal locations for parking that provide best available solar exposure given geographic, time, vehicle, and environmental limitations.

In other aspects, embodiments of the present disclosure may provide an ideal self-managing recharging system for driverless AV that cause a vehicle to reposition itself within a geofenced region. If vehicle is human driven, then commands may be issued to human driver as to where to park inside the parking lot or street parking locations, which creates a positive user experience and provides practical and easy-to-utilize information for parking.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but embodiments may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

Terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a first vehicle, comprising:
   receiving, via a processor and based on a vehicle parking spot locator request, a solar radiance dataset indicative of historic solar radiance at a first parking location of a localized vehicle parking region;
   determining, via the processor and based on the solar radiance dataset, that a predicted solar energy production at the first parking location in the localized vehicle parking region will be greater than a second parking location during a parking duration;
   determining, via the processor and based on the solar radiance dataset, a first vehicle orientation at the first parking location providing a maximized probability of solar exposure during the parking duration;
   positioning, via the processor, the first vehicle in the first parking location and the first vehicle orientation;
   charging a first vehicle battery during the parking duration;
   measuring, during the parking duration, a surface solar radiance output at or proximate to the first parking location by:
      determining, via a LiDAR sensory device, a k1 energy output,
      determining, via an infrared sensory device, a k2 energy output,
      determining, via a solar panel voltmeter sensory device, a k3 energy output,
      determining, via a drone-based sensory device, a k4 energy output, and
      computing the surface solar radiance output based on one or more of the k1, k2, k3, and k4 energy outputs; and
   updating a solar radiance map based on the surface solar radiance output.

2. The method according to claim 1, wherein the solar radiance dataset is based on a solar radiance map indicative of measured solar energy availability in a geofenced region comprising the first parking location.

3. The method according to claim 1, wherein the solar radiance dataset comprises historic measured solar radiance availability localized at the first parking location.

4. The method according to claim 2, wherein the solar radiance dataset further comprises date and time data, and weather condition information at the first parking location, the weather condition information associated with the date and time data.

5. The method according to claim 2, wherein the solar radiance map comprises measured solar radiance data provided via a second vehicle sensory system.

6. The method according to claim 5, wherein the second vehicle sensory system is disposed on an autonomous aerial drone vehicle chassis.

7. The method according to claim 5, wherein the second vehicle sensory system is disposed in a second vehicle chassis.

8. The method according to claim 1, wherein updating the solar radiance map comprises:
   transmitting, via the processor, the surface solar radiance output to a solar radiance map server.

9. The method according to claim 1, wherein the k1, k2, k3, and k4 energy outputs comprise a first scaling factor, a second scaling factor, a third scaling factor, and a fourth scaling factor.

10. The method according to claim 9, wherein the third scaling factor is greater than the first scaling factor, the second scaling factor, and the fourth scaling factor.

11. The method according to claim 1, further comprising:
   determining, via the processor and based on the solar radiance dataset, a first estimate of partial duration solar radiance output during a future subset of parking duration;
   determining, via the processor and based on the solar radiance dataset, that the second parking location within the localized vehicle parking region is associated with a second estimate of partial duration solar radiance output, wherein the second estimate of partial duration solar radiance output is greater than the first estimate; and
   causing, via the processor, the first vehicle to change location from the first parking location to the second parking location.

12. The method according to claim 11, further comprising:
   determining, via the processor and based on the solar radiance dataset, a second vehicle orientation at the second parking location,
   wherein the second vehicle orientation comprises a greater probability of solar exposure during the future subset of parking duration than the first vehicle orientation; and
   positioning, via the processor, the first vehicle in the second parking location according to the solar radiance dataset and the second vehicle orientation.

* * * * *